July 22, 1958 R. A. BENNETT ET AL 2,844,048
TORQUE ARMS
Filed Oct. 21, 1953 4 Sheets-Sheet 1
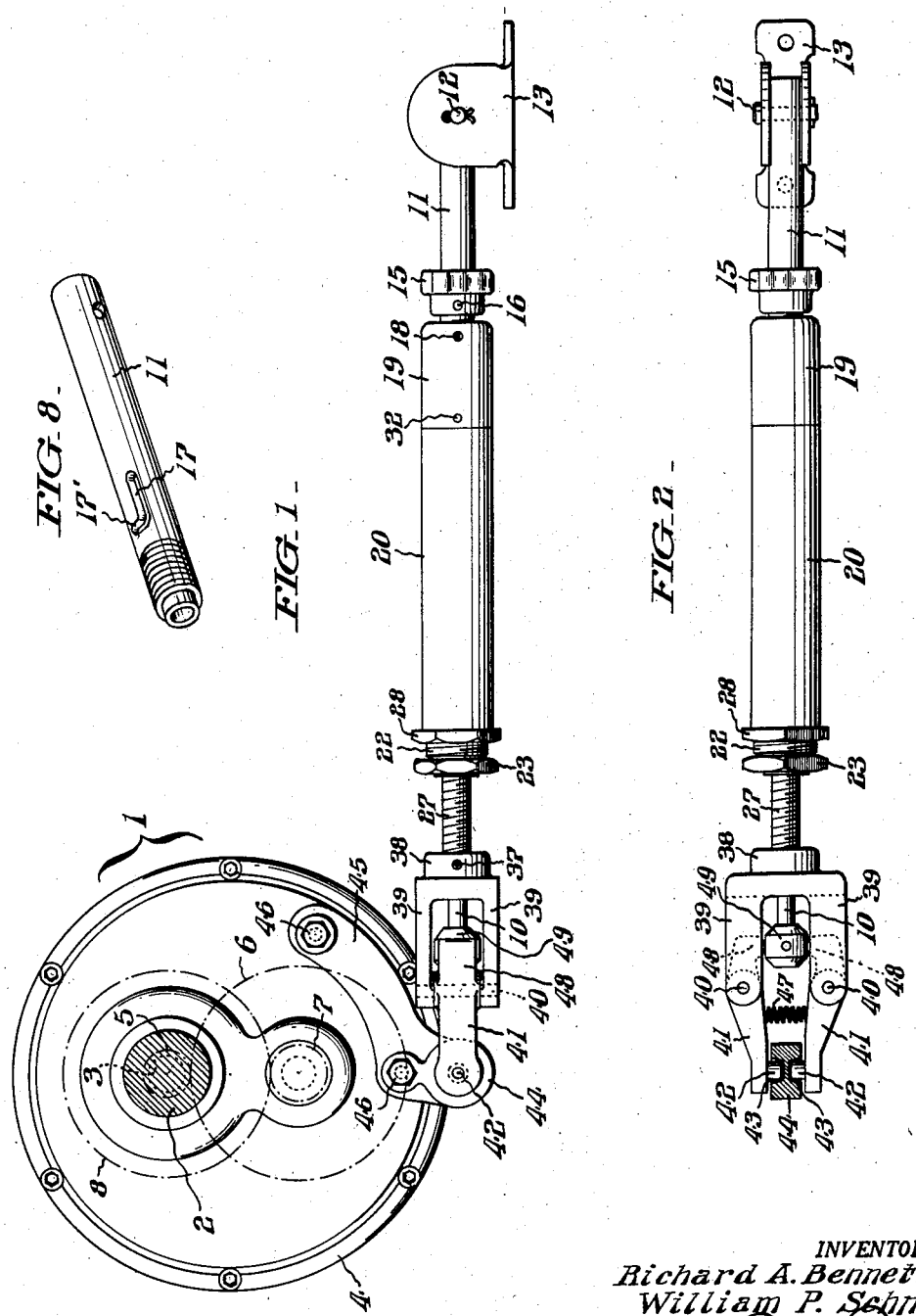
INVENTORS.
Richard A. Bennett &
William P. Schmid,
BY Paul & Paul
ATTORNEYS.

July 22, 1958   R. A. BENNETT ET AL   2,844,048
TORQUE ARMS
Filed Oct. 21, 1953   4 Sheets-Sheet 2
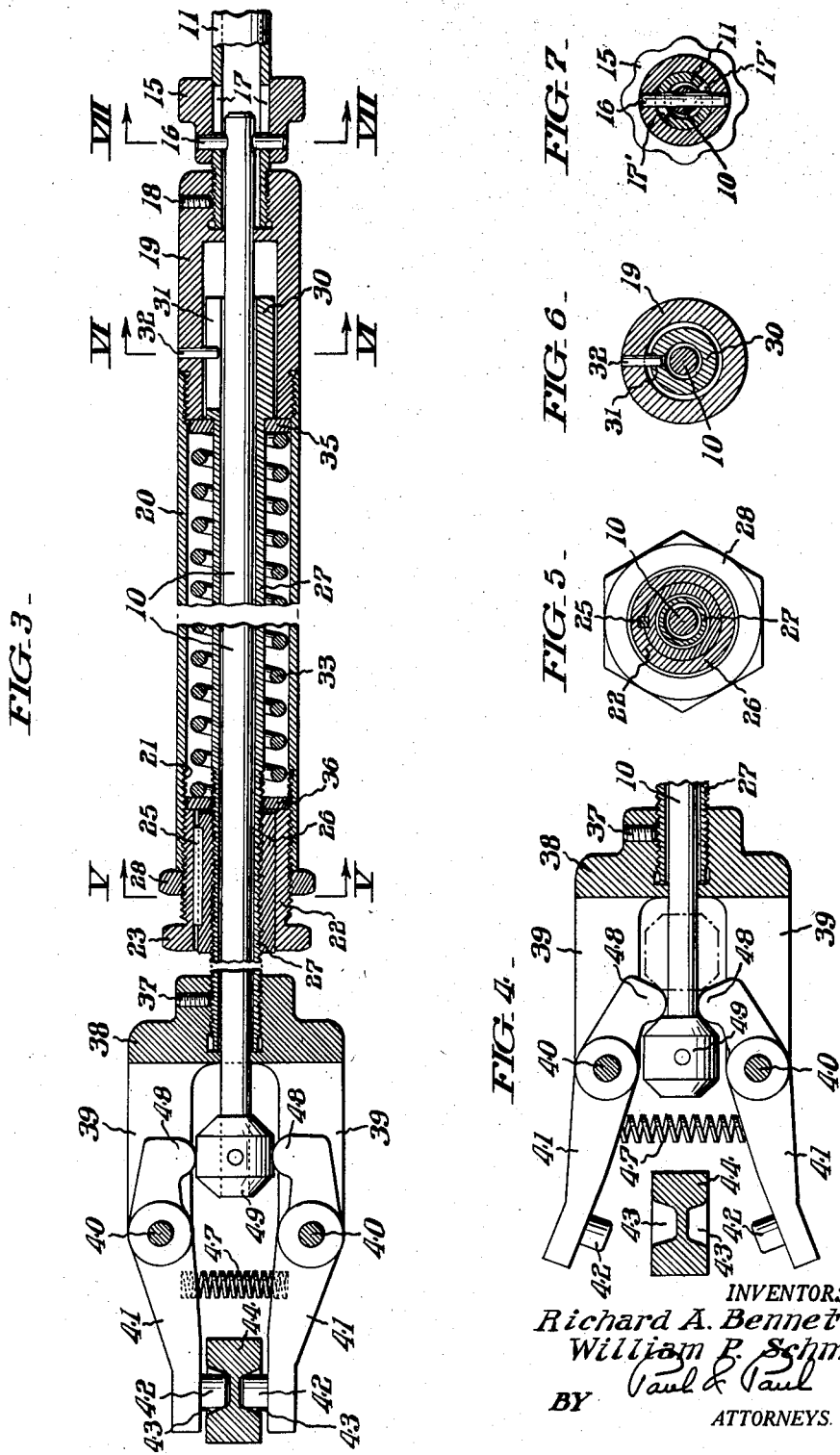
INVENTORS.
Richard A. Bennett &
William P. Schmid,
BY Paul & Paul
ATTORNEYS.

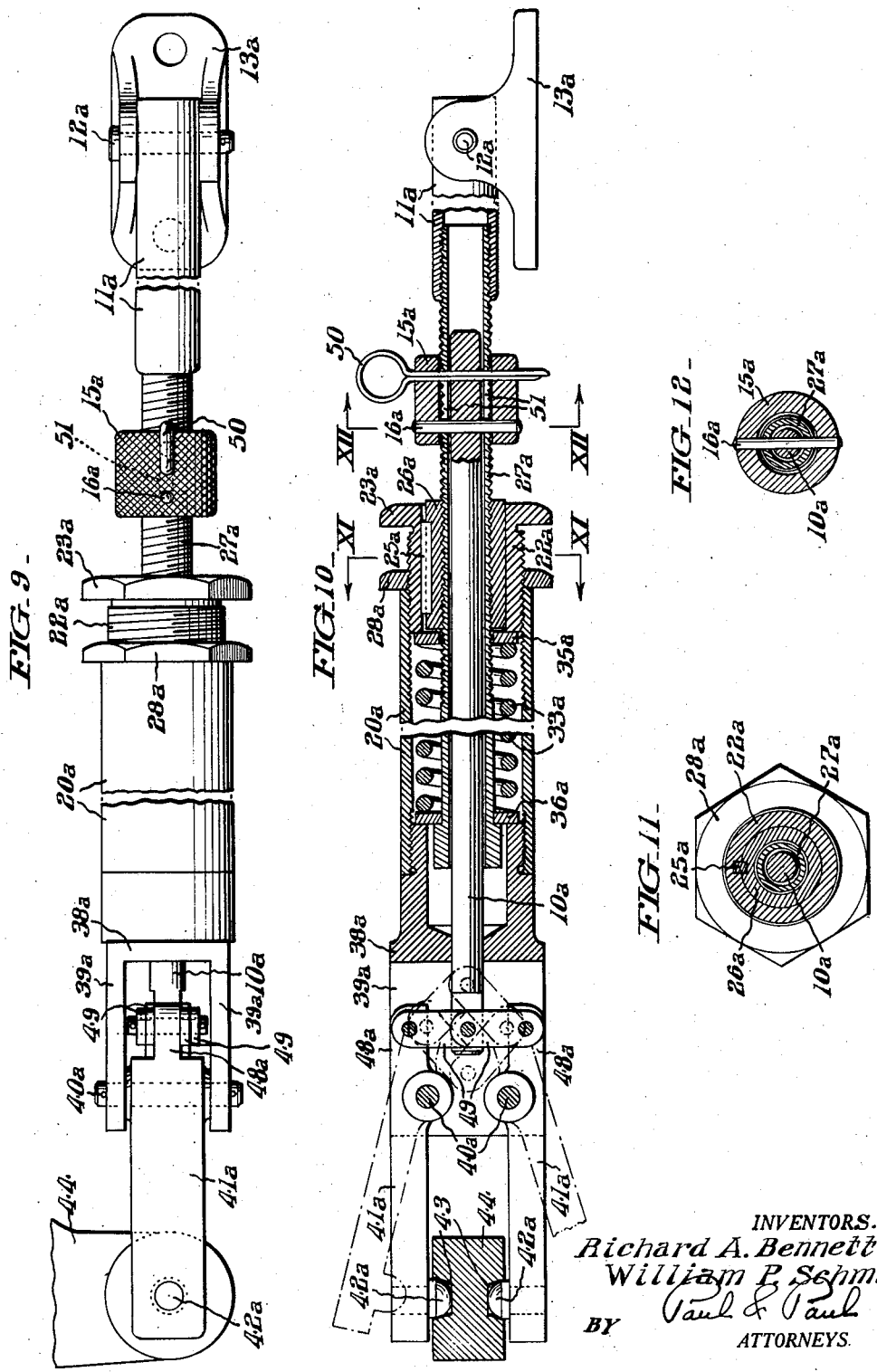

July 22, 1958  R. A. BENNETT ET AL  2,844,048
TORQUE ARMS
Filed Oct. 21, 1953  4 Sheets-Sheet 4
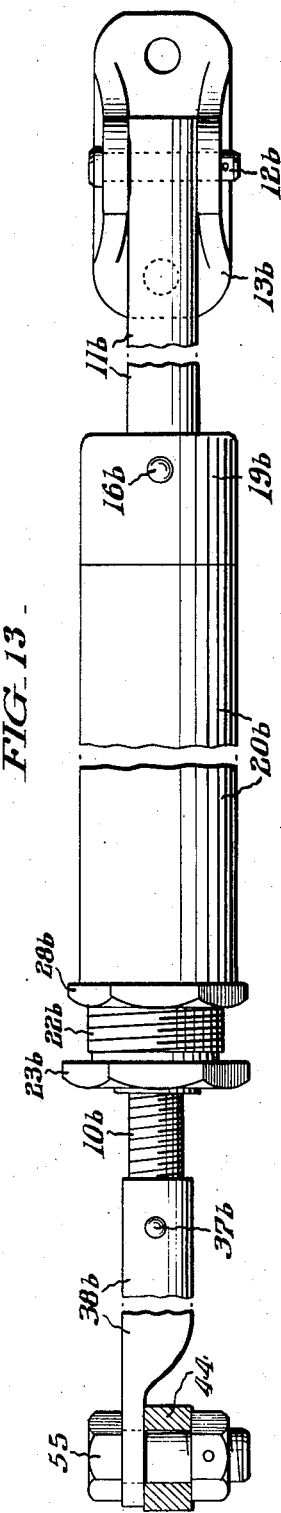
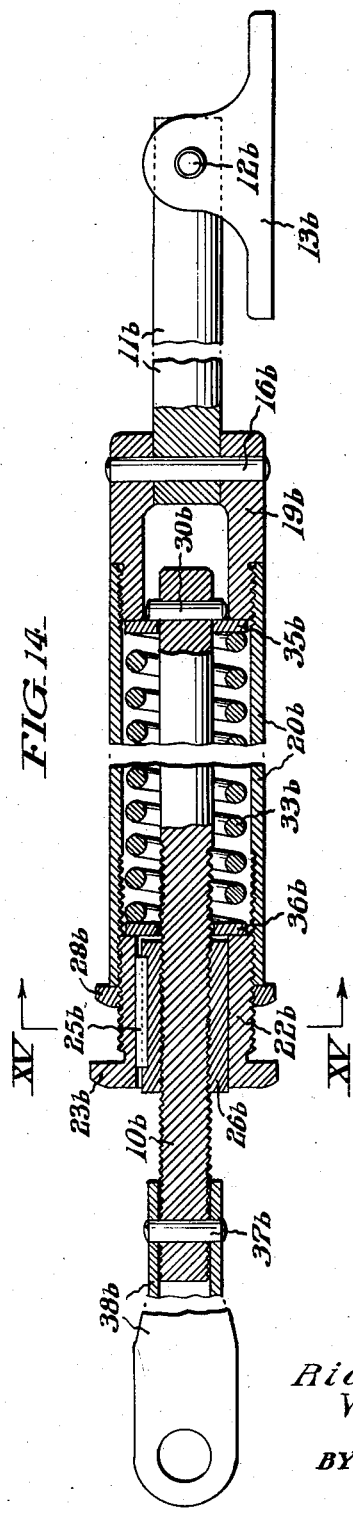
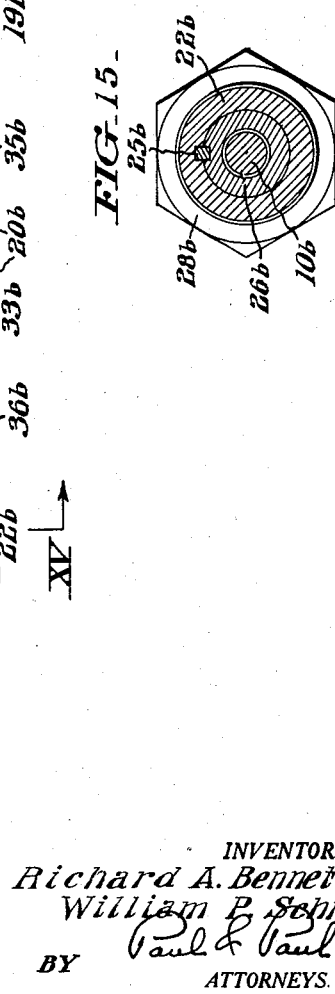
INVENTORS.
Richard A. Bennett &
William P. Schmid,
BY Paul & Paul
ATTORNEYS.

United States Patent Office 2,844,048
Patented July 22, 1958

2,844,048
TORQUE ARMS

Richard A. Bennett, Elkins Park, and William P. Schmid, Drexel Hill, Pa., assignors to The American Pulley Company, Philadelphia, Pa., a corporation of Pennsylvania Application October 21, 1953, Serial No. 387,414

8 Claims. (Cl. 74—584)

This invention relates to torque arms, that is to say, to arms useful, for example, in restraining change speed transmission devices such as disclosed in U. S. Patent No. 2,504,066 granted to J. D. Christian on April 11, 1950, from rotating with the shafts of the apparatus or machines to which they are connected.

The chief aim of our invention is to provide a simple and reliable torque arm which will absorb a limited amount of end pull or end thrust which may be induced in it during normal operation of the speed change transmission device.

Another object of our invention is to provide a torque arm which, upon subjection to pull or thrust beyond a predetermined normal permissable extent in the event of overloading of the transmission device, will automatically release itself from the device and thereby prevent injury to the latter as well as to the driven apparatus or machine.

In connection with a torque arm having the foregoing attributes, it is a further object of our invention to provide adjusting means whereby the resistivity of the arm to slight end pull or thrust, or to self release, can be closely regulated as may be desired or required to suit special conditions likely to be met within practice.

Other objects and attendant advantages will appear from the following detailed description of the attached drawings, wherein:

Fig. 1 is a view of a side elevation showing our improved overload release torque arm connected to the speed change transmission device.

Fig. 2 is a view of the torque arm showing the same in top plan.

Fig. 3 is a fragmentary broken-out view drawn to a larger scale and showing the torque arm in longitudinal section.

Fig. 4 is a fragmentary view corresponding to Fig. 2 showing the torque arm disconnected from the transmission device.

Figs. 5, 6 and 7 are cross sections taken respectively as indicated by the angled arrows V—V, VI—VI and VII—VII in Fig. 3.

Fig. 8 is a perspective view of one of the parts of the torque arm.

Figs. 9 and 10 are views corresponding to Figs. 2 and 3 of an alternative embodiment of our invention.

Figs. 11 and 12 are cross sections taken as indicated by the angled arrows XI—XI and XII—XII in Fig. 10.

Figs. 13 and 14 are views in turn like Figs. 2 and 3 showing another alternative embodiment of our invention; and Fig. 15 is a cross section taken as indicated by the angled arrows XV—XV in Fig. 14.

With specific reference, first more particularly to Figs. 1–9 of these illustrations, the numeral 1 comprehensively designates a speed change transmission device of the type disclosed in the patent hereinbefore referred to, whereof the output shaft 2 is adapted to be axially connected to the shaft of a machine or apparatus (not shown) to be driven. The input shaft 3 of the device, whereto the power is applied, for example by a pulley connection with an electirc motor as in the patent, is in direct line with the output shaft 2, said shafts being journalled for rotation in the opposite side walls of the casing 4 of said device, motion being communicated from said input shaft to said output shaft through the medium of an interposed train of speed reducing gears 5, 6, 7 and 8 within said casing.

The torque arm with which the present invention is more especially concerned comprises, in the embodiment shown in Figs. 1–7, a rod 10 which is connected to a short length of tubing 11 fulcrumed at one end by a transverse pin 12 to an anchorage bracket 13, the latter being securable to the frame of the driven machine or apparatus or to a fixed surface adjacent thereto by means of cap screws or bolts, not shown. The connection just referred to includes a collar 15 with a diametral pin 16 which extends crosswise through rod 10 and which is engagable, bayonet lock fashion, into lateral offsets 17' of longitudinal diametral slots 17 (see Fig. 8) in said tube.

Threadedly engaged into the remote end of tube 11 and fixed against relative rotation by a set screw 18 is the closure member 19 of a thin walled cylinder 20 whereof the opposite end is internally threaded as at 21 and closed in part by a tubular gland 22 having a polygonal head 23 for wrench application. Slidably engaged in gland 22 and spline connected therewith at 25 is an internally threaded bushing 26 which is threadedly engaged, in turn, with an elongate sleeve 27. A jam nut 28 screwed upon the shank portion of gland 22 and abutting the corresponding end of cylinder 20 is relied upon to secure said gland against accidental displacement in adjusted positions. As shown, sleeve 20 surrounds the portion of rod 10 within cylinder 20 and is provided, at one end, with an enlargement 30 having a longitudinal slot 31 into which an inward radial stud 32 on the end closure member 19 of the cylinder projects to prevent relative rotation between said sleeve and said cylinder. Surrounding sleeve 27 within cylinder 20 is a helical compression spring 33 whereof the opposite ends respectively abut collars 35 and 36 axially free on said sleeve, the collar 35 being normally stopped against the inner end of member 19 and the collar 36 against the inner end of gland 22 by the force of said spring.

Secured upon the outer or protruding end of sleeve 27 and held against rotation in relation thereto by a set screw 37, is a split clevis head 38 between the side portions 39 of which are fulcrumed to rock independently about cross pins 40, opposing clasp fingers 41. At their distal ends the clasp fingers 41 have stud projections 42 adapted to engage normally into indentations 43 in the opposite sides of the radial projection 44 of an arcuate bracket piece 45 secured by bolts 46 to one side wall of the casing of the transmission device 1 as shown in Fig. 1. The helical compression spring indicated at 47 tends to maintain the rounded tails 48 of the fingers 41 normally in contact with a cam block 49 at the outer end of rod 10, said cam block being bevelled at opposite ends to function in a manner presently explained.

Operation

Normally, the spring 33 within cylinder 20 acts to keep the parts of the torque arm in the relation shown in Fig. 3, but will yield to permit slight endwise pull or endwise thrust which may be induced between rod 10 and sleeve 27 during normal operation of the transmission device 1, the length of the cylindric portion of the cam block 49 on said rod being such as to permit this slight movement without attendant disconnection of the fingers 41 from the bracket projection 44 on the device. However, if the end thrust upon the torque arm is exceeded beyond the permissible extent just mentioned to such a degree that the tail ends 48 of the clasp fingers 41 ride off the beveled rear end of cam 49, said fingers will be forced outward by the spring 47 and their stud projections 42 consequently retracted from the side indentations 43 of the bracket projection 44 on the transmission device as shown in Fig. 4. Upon such retraction, it will be seen that the torque arm is released to drop away from the transmission device by its own weight. During this action, the spring 33 will be compressed to a greater extent than ordinarily and the collar 36 be displaced from engagement with the inner end of element 22 by movement of the bushing 26 threaded upon sleeve 27. Similar action will take place in the event of pull of the torque rod beyond the aforedescribed permissible extent, in which event the tail ends 48 of the clasp fingers 41 will ride off the bevelled outer end of the cam 49, again with incidental further compression of spring 33 and movement this time of collar 35 away from the inner end of the closure 19 of cylinder 20 by the enlargement 30 at the inner end of sleeve 27. The force of spring 33 can be regulated, as may be desirable or required, by first backing off jam nut 28 and then rotating the gland 22 in one direction or the other, this being possible by virtue of the fact that the screw threads on the latter and on sleeve 27 are of the same pitch. Disconnection of the torque arm from the transmission device is accomplished simply by turning the collar 15 slightly to release the cross pin 16 thereof from the lateral notches 17' of the longitudinal slots 17 in tubular element 11, and then pulling rearward upon said collar. As a result, rod 10 is moved in the same direction for withdrawal of the cam 49 thereon from between the tail ends 48 of the clasp fingers 48 which will thereupon be forced apart by spring 47. Initial or reconnection of the torque arm is effected simply by reversal of the above procedure.

*Alternative embodiment of Figs. 9-12*

In this embodiment of our invention, the sleeve 27a is threadedly engaged in the short tubular member 11a which is fulcrumed at 12a to the anchorage 13a, and the collar 15a is mounted upon said sleeve. The diametral pin 16a of collar 15a passes through straight-away longitudinal slots 51 in sleeve 27a and through a diametral hole in rod 10a. Normally, pin 16a engages the slots 51 of sleeve 27a at one end, while a removable cotter pin 50, passed through diametral holes in collar 15a and a registrable diametral hole in rod 10a, also passes through the slots 51 and is normally engaged with the opposite ends of said slots. In this instance, the clevised head 38a has a shouldered shank which is threaded into the remote end of the cylindric shell 20, and the collar 36a is stopped against the end of said shank. Threadedly engaged in the opposite end of the cylindric shell 20a is the gland 22a which has the nut head 23a; and slidingly disposed and held against relative rotation within said gland is the bushing 26a which has a threaded connection with the sleeve 27a, the two threads being of the same pitch as in the first described embodiment. Likewise as before, the jam nut at 28a here serves to prevent accidental displacement of the gland 22a and the bushing 26a in adjusted positions; and one end the spring 33a bears against the collar 36a and the other end against the collar 35a which is normally stopped against the inner end of gland 22a. Another innovation to be noted here is that the rod 10a is connected to the tail ends 48a of the clasp fingers 41a by a pair of toggle links 49 which are normally aligned as shown in full lines in Fig. 10 to keep the lug projections 42a of said fingers engaged in the side indentations of the bracket lug 44. However, in the event of end pull or end thrust upon the torque arm due to overloading, the toggle connection will be upset in one direction or the other and the fingers 41a retracted after the manner shown in dot and dash lines in Fig. 10. Functioning of the modified torque arm is otherwise the same as hereinbefore described in connection with the first embodiment of my invention. Disconnection of the modified torque arm is accomplished by withdrawing the cotter pin 50, and then pulling rearwardly upon the collar 15a to retract the rod 10a relative to the sleeve 27a (as permitted by the slots 51 in the latter) and so break the toggle connection for retraction of the clasp fingers 41a.

*Alternative embodiment of Figs. 13-15*

In this embodiment, the member 11b is solid and round in section, one end thereof being pivotally connected by a pin 12b to the anchorage 13b, and its other end being secured by a cross pin 16b within an axial bore of the member 19b which closes the corresponding end of the cylindric tube 20b. Instead of a clevis as in the previous embodiments, an eye lug 38b is secured to the protruding end of rod 10b and fixed by a cross pin 37b for direct pivotal connection, through the medium of a fulcrum bolt 55, to the bracket 44 on the transmission device (not shown). Furthermore, instead of an enlargement, rod 10b is here provided at its opposite end with a cross pin 30b for engaging the collar 35b. In all other respects the alternative embodiment is identical in construction with the first described embodiment. Accordingly, in order to dispose with the necessity for repetitive description, all other component elements, not particularly referred in the last modification but having their counterparts in the first described embodiment, are identified by the same reference numerals with addition, in each instance, of the letter "b" for convenience of more ready distinction.

As to further modifications, the toggle link means shown in Figs. 9 and 10 for actuating the clasp fingers may be substituted for the cam arrangement in Figs. 3 and 4, or vice versa as will be readily understood without the need for additional illustrations to the drawings. While in accordance with the provisions of the statutes, we have illustrated and described the best forms of embodiment of our invention now known to us it will be apparent to those skilled in the art that changes may be made in the form of the apparatus described without departing from the spirit and scope of the invention, as set forth in the appended claims, and that in some cases certain features of our invention may be used to advantage without a corresponding use of other features.

Having thus described our invention, we claim:

1. A torque arm comprising a cylinder; a component telescoped within the cylinder and having an enlargement at its distal end; a gland with a thread engaged for the purposes of axial adjustment in one end of the cylinder; a bushing through which the telescoped component extends having threaded engagement with the latter of the same pitch as the first mentioned thread, and a sliding key connection with the gland; a helical spring surrounding the telescope component within the cylinder in compression between two collars slidably free on said telescoped component, one collar normally bearing against the inner end of the gland, and the other collar normally bearing against an internal annular shoulder adjacent the opposite end of the cylinder and the enlargement at the corresponding end of the telescoped element, as and for the purpose set forth.

2. A torque arm according to claim 1, further including a jam nut on a projecting portion of the gland for engaging the corresponding end of the cylinder to prevent accidental displacement of said gland in adjusted positions.

3. A torque arm for restraining bodily rotation of a speed change transmission device about the drive shaft of a machine to be driven, said arm comprising a cylinder with means for pivotally connecting it at one end to a fixed anchorage; a sleeve element extending into the cylinder and having an enlargement at its inner end; yielding means within the cylinder operative between the latter and the sleeve element; a pair of opposing clasp fingers pivoted onto the outer end of the sleeve for normally engaging a radial projection on the transmission device; spring means tending to separate the fingers; an endwise restrained rod extending into the sleeve element and fixed in relation to the cylinder; and a cam at the outer end of the rod contacted by tails on the fingers to normally maintain said fingers closed in opposition to the spring whereby, upon imposition of either end pull or end thrust upon the arm, with attendant movement of the head relative to the cam beyond a predetermined extent as a consequence of overloading of the device, the clasp fingers are retracted from the projection on said device to release the arm.

4. A torque arm for restraining bodily rotation of a speed change transmission device about the drive shaft of a machine to be driven, said arm comprising a cylinder with means for pivotally connecting it at one end to a fixed anchorage; an adjusting gland threadedly engaged into the opposite end of the cylinder; a bushing having a sliding spline connection within the gland; a sleeve element extending into the cylinder through the bushing, said element having an enlargement at its inner end and a thread of the same pitch as the first mentioned thread, in engagement with the bushing; collars freely engaged upon the sleeve element within the cylinder; a helical spring surrounding the sleeve for yieldingly maintaining one of the collars in engagement with the inner end of the gland and the other collar in engagement with the enlargement of the sleeve element; a pair of opposing clasp fingers pivoted on the outer end of the sleeve for normally engaging a radial projection on the transmission device; a spring tending to separate the fingers; an endwise restrained rod extending into the sleeve element; and a cam at the outer end of the rod contacted by tails on the fingers to normally maintain the fingers closed in opposition to the last mentioned spring whereby, upon imposition of either end pull or end thrust upon the arm, with attendant movement of the head relative to the cam beyond a predetermined extent as a consequence of overloading of the device, the clasp fingers are retracted from the projection of said device to release the arm.

5. A torque arm for restraining bodily rotation of a speed change transmission device about the drive shaft of a machine to be driven, said arm comprising a cylinder with means for pivotally connecting it at one end to a fixed anchorage; a sleeve element extending into the cylinder and having an enlargement at its inner end; yielding means within the cylinder operative between the latter and the sleeve element; a pair of opposing clasp fingers pivotally connected to the outer end of the sleeve for normally engaging a radial projection on the transmission device; an endwise restrained rod extending into the sleeve element; and toggle links connecting tails on the fingers with the outer end of the rod for normally maintaining said fingers closed whereby, upon impartation of either end pull or end thrust upon the arm, with attendant movement of the sleeve relative to the cylinder beyond a predetermined limited extent as a consequence of overloading of the device, the toggle links are collapsed and the clasp fingers are retracted from the projection on said device to release the arm.

6. A torque arm according to claim 3, wherein the cylinder has a smaller tubular extension through which it is connected to the anchorage; wherein an end of the rod projects into the tubular extension of the cylinder; wherein a cross pin at said end of the rod engages through diametral longitudinal slots in said extension; wherein the ends of the pin are secured in a collar capable of rotation about and of being slid along said extension; and wherein the slots have lateral offsets at one end into which the ends of the cross pin are normaly engaged as and for the purpose set forth.

7. A torque arm for restraining bodily rotation of a speed change transmission device about the drive shaft of a machine to be driven, said arm comprising a cylinder; an adjustable screw gland closing one end of the cylinder; a sleeve element extending through the gland into the cylinder and having an enlargement at its inner end; means pivotally connecting the protruding end of the sleeve to a fixed anchorage; a spring in compression between the enlargement of the sleeve and the inner end of the gland within the cylinder; a rod extending through the distal end of the cylinder into the sleeve and fixed in relation to the latter; a pair of opposing clasp fingers pivotally connected to the distal end of the cylinder for normally engaging a radial projection on the transmission device; and toggle links connecting tails on the fingers with the outer end of the rod for normally maintaining the fingers closed whereby, upon impartation of either end pull or thrust to the arm, with attendant movement of the cylinder relative to the rod beyond a predetermined limited extent as a consequence of overloading of the device, the toggle links are collapsed and the clasp fingers are retracted from the projection on said device to release the arm.

8. A torque arm according to claim 7, wherein a slide collar surrounds the protruding portion of the sleeve and has a cross pin which passes through diametral longitudinal slots in the protruding portion of the sleeve and through a diametral aperture in the rod; and wherein the pin is normally maintained in engagement with the slots at one end of the latter by a removable supplemental pin passed through diametral apertures in the collar spaced longitudinally from the first mentioned pin and through a correspondingly spaced diametral aperture in the rod and engages the opposite ends of said slots, as and for the purpose set forth.

References Cited in the file of this patent

UNITED STATES PATENTS

| | | |
|---|---|---|
| 594,729 | Crosby | Nov. 30, 1897 |
| 602,569 | Turner | Apr. 19, 1898 |
| 1,091,449 | Westin | Mar. 24, 1914 |
| 1,262,456 | Colwell | Apr. 9, 1918 |
| 1,424,997 | Edwards | Aug. 8, 1922 |
| 2,554,969 | Williams | May 29, 1951 |
| 2,753,969 | Chung | July 10, 1956 |

OTHER REFERENCES

Dodge: "Speed Reducers," page 11, Sept. 16, 1952.